United States Patent
Renaud et al.

(10) Patent No.: US 12,474,916 B2
(45) Date of Patent: Nov. 18, 2025

(54) UPDATING FIRMWARE USING A NFC STICKER

(71) Applicant: Tridonic GmbH & Co KG, Dornbirn (AT)

(72) Inventors: Daniel Renaud, Tyne And Wear (GB); Jonathan Lupin, Inverness (GB); Adam Baker, Tyne And Wear (GB)

(73) Assignee: Tridonic GmbH & Co KG, Dornbirn (AT)

( * ) Notice: Subject to any disclaimer, the term of this patent is extended or adjusted under 35 U.S.C. 154(b) by 238 days.

(21) Appl. No.: 18/252,603

(22) PCT Filed: Oct. 13, 2021

(86) PCT No.: PCT/EP2021/078256
§ 371 (c)(1),
(2) Date: May 11, 2023

(87) PCT Pub. No.: WO2022/100947
PCT Pub. Date: May 19, 2022

(65) Prior Publication Data
US 2024/0004632 A1  Jan. 4, 2024

(30) Foreign Application Priority Data
Nov. 13, 2020  (EP) .................................... 20207395

(51) Int. Cl.
*G06F 8/65* (2018.01)
*H04B 5/26* (2024.01)
(Continued)

(52) U.S. Cl.
CPC ................. *G06F 8/65* (2013.01); *H04B 5/26* (2024.01); *H04B 5/70* (2024.01); *H05B 47/19* (2020.01)

(58) Field of Classification Search
None
See application file for complete search history.

(56) References Cited

U.S. PATENT DOCUMENTS 10,524,334 B1 * 12/2019 Price ...................... H05B 45/37
11,089,664 B1 *  8/2021 Price ...................... H05B 45/56
(Continued)

OTHER PUBLICATIONS

"iMAX B6 Charger"; SKYRC.com website as captured by the Wayback Machine Internet Archive (archive.org) [full URL included in ref.]; Nov. 11, 2020 (Year: 2020).*
(Continued)

*Primary Examiner* — Yuqing Xiao
*Assistant Examiner* — Clint Thatcher
(74) *Attorney, Agent, or Firm* — Andrus Intellectual Property Law, LLP

(57) ABSTRACT

A driver device for driving at least one lighting device comprises a driving circuit, a control circuit configured to control the driving circuit based on a firmware stored in a memory of the driver device, and a transceiver configured to perform near field communication via an antenna. The control circuit is configured to control the transceiver to detect presence of a passive near field communication tag within range of the antenna. Preferably, the driver device includes the control circuit is configured to control the transceiver to acquire a data file from the detected passive near field communication tag, and to perform at least one of updating the firmware or controlling the light driving circuit based on the acquired data file.

10 Claims, 4 Drawing Sheets

(51) Int. Cl.
    *H04B 5/70*         (2024.01)
    *H05B 47/19*      (2020.01)

(56)            References Cited

U.S. PATENT DOCUMENTS

| | | | |
|---|---|---|---|
| 2006/0187080 | A1 | 8/2006 | Slatter |
| 2011/0143661 | A1* | 6/2011 | Hartwig .................. G06F 8/65 |
| | | | 455/41.1 |
| 2012/0252480 | A1* | 10/2012 | Krutt ....................... H04B 5/00 |
| | | | 455/41.1 |
| 2014/0365362 | A1* | 12/2014 | Dua ..................... H04L 12/282 |
| | | | 455/41.1 |
| 2015/0091437 | A1* | 4/2015 | Kim ....................... G09F 13/22 |
| | | | 315/71 |
| 2015/0280471 | A1* | 10/2015 | Farhi ..................... H02J 7/0044 |
| | | | 320/137 |
| 2015/0341969 | A1 | 11/2015 | Brochu et al. |
| 2017/0238397 | A1 | 8/2017 | Green et al. |

OTHER PUBLICATIONS

"Status LED and Device Modes"; Particle.io website [full URL include in ref.]; Aug. 6, 2015 (Year: 2015).*
PCT/EP2021/078256, International Search Report and Written Opinion dated Jan. 13, 2022, 13 pages.

* cited by examiner

UPDATING FIRMWARE USING A NFC STICKER

CROSS REFERENCE TO RELATED APPLICATIONS

The present application is the U.S. national stage application of international application PCT/EP2021/078256 filed Oct. 13, 2021, which international application was published on May 19, 2022 as International Publication WO 2022/100947A1. The international application claims priority to European Patent Application No. 20207395.3 filed Nov. 13, 2020.

TECHNICAL FIELD OF THE INVENTION

The invention concerns the field of updating firmware of driver devices for lighting applications. In particular, a method, a driver device and a near field communication capable sticker device for updating the firmware of the driver device using a near field communication interface of the driver device are provided.

BACKGROUND OF THE INVENTION

Driver devices, often also referenced as ballast devices form an integral part of contemporary lighting systems. A driver device draws energy from a mains supply grid, e.g. a AC mains supply, and provides a load current, e.g. a DC current, to lighting means, which emit light, for example by driving a plurality of light emitting diodes (LED). The light driver is an essential structural component including a housing, input interfaces, e. g. to mains supply, control inputs (on, off, dimming values), output interfaces providing the load current lighting modules, and the electronic circuitry arranged within the housing, for example switched mode power supply circuits. The electronic circuitry includes control circuits, often in the form of a microprocessor running a software or firmware. The light driver may be installed within a lamp fixture and is usually wired with the other components of the lighting system, for example switches and lighting modules.

SUMMARY OF THE INVENTION

It is current practice to return a driver device to the manufacturer in order to update its firmware or to install a new firmware on the driver device. This updating procedure for the firmware is cumbersome and costly, as for a firmware update the driver devices need to be de-installed in the field, shipped from a user's premise to the manufacturer's or distributor's site. At the manufacturer's site, the update of a large number of driver devices from different senders is to be performed, after which the driver devices are to be returned to the user for reintegration into the lighting system. Thus, updating the firmware of driver devices already shipped to a customer involves significant time and cost.

Current driver devices often include a near field communication interface (NFC interface), for example for ease of a commissioning procedure. The near field communication interface in some examples also offers the possibility to update the firmware stored in a memory of the driver device, either at the manufacturer's site or in the field at the customer's site. Even in case of performing the update in the field at the customer's site using the NFC interface a service technician requires physical access to each driver device in the field. The update still requires a certain amount of time, due to having to keep a NFC capable reader/writer device in the NFC field during the entire programming/updating process of each individual driver device.

Considering the discussed aspects and disadvantages of updating the firmware of driver devices for lighting applications, the firmware updating process as currently performed could be improved and the mentioned disadvantages of current firmware updating processes be addressed.

The independent claims define a system according to a first aspect, a driver device according to a second aspect and a method for updating a driver device according to a third aspect, which offer an advantageous solution to the problem.

The dependent claims define advantageous embodiments of the driver device.

The driver device for driving at least one lighting device according to the first aspect comprises a light driving circuit configured to provide a load current to the at least one lighting device, a control circuit configured to control the driving circuit based on a firmware stored in a memory of the driver device, and a transceiver configured to perform near field communication via an antenna. The driver device is characterized by the control circuit being configured to control the transceiver to detect a presence of a passive near field communication tag within range of the antenna.

This offers the advantage that operation of the driver device may be made dependent on the presence of an untampered near field communication tag (NFC tag) within range of the antenna of the driver device. The NFC tag may therefore act as a safety feature against unauthorized use that inhibits unauthorized operation of the driver device in case the NFC tag is not present. In this application, the NFC tag may be applied in form of a quality sticker (quality label) including the NFC tag on the driver device.

According to a preferred embodiment, the control circuit is further configured to control the transceiver to acquire a data file from the detected passive near field communication tag, and to perform at least one of updating the firmware or controlling the light driving circuit based on the acquired data file.

The driver device includes, compared to existing solutions, a modified transceiver, which is capable to detect the presence of a passive NFC device in its vicinity, and the controller of the driver device is adapted to update its firmware from the data file stored in the passive NFC device. The driver device therefore includes the improved capability to detect a NFC tag arranged within its NFC magnetic field, to perform a reading process for acquiring an update data file from the NFC tag, and to update its firmware using the data file acquired via the transceiver.

Updating the firmware of the driver device becomes possible without de-installing the driver device from a lighting fixture or returning the driver device to the site of the manufacturer. Even more advantageous, updating the firmware may even be reduced to providing NFC tags storing an update data file to the user with instructions where to place the NFC tags on the driver devices in order to initiate the firmware update process. The presence of a trained service technician with specialized technical equipment, e.g. a mobile computer running dedicated software with an NFC interface for interfacing the driver device to install the firmware update is not necessary, as the driver device includes the specific capability itself with the capability to read the update data file from a NFC tag.

In an advantageous embodiment, the control circuit is configured to control the transceiver to read a version identifier corresponding to the data file from the detected passive near field communication tag. The control circuit compares the read version identifier with a version identifier of the firmware stored in the memory of the driver device. In case the firmware version identifier differs from the stored version identifier, the control circuit updates the firmware based on the acquired data file. Generally, the "new" firmware may be read from the NFC tag in case that the version identifier differs as mentioned above which even allows to step back to an earlier version. According to a preferred embodiment however, it is also possible to limit updating to version identifiers that indicate a later version of the firmware.

Thus, the driver device initiates the firmware update process—a person may simply be instructed that an update is necessary, to place a sticker including the NFC tag device on a suitable position on the housing of the driver device, and then update process for the firmware is started and executed in a fully automated manner. The person may then move to a next driver device on the premises requiring the firmware update without being required to be present during the entire firmware updating process or having the determine each time, what firmware version is currently installed and if the firmware update is indeed necessary for the specific driver device. A significantly shorter firmware update time over a plurality of driver devices is possible and, compared to updating procedure that requires shipping of the device, almost no interruption of operation is necessary. Furthermore, a lower qualification level of the person performing the firmware in the field is required.

Firmware updates may easily be marketed as a service. In return for a service fee, NFC tags in the form of simple stickers including the NFC tags is shipped to the customer. The customer may then initiate the update procedure himself even concerning driver devices without having a network communication for a remote update via a network available. This enables to scale the actual features of the driver device while the driver device is at the customer's site.

The driver device does not need to have a functioning network connection and no actual presence of a technician of an external device manufacturer is necessary. In combination with using the short range wireless communication via NFC, privacy and security aspects may easily be addressed by the driver device and the specific firmware update capability. Many customers do not favour remotely connecting driver devices and enabling remote access to the driver devices, which may acquire sensitive information such as localized presence information due to installed presence sensors.

The control circuit of the driver device according to an advantageous embodiment is configured to detect presence of the passive near field communication tag (NFC tag) only during a power-up process of the driver device.

The control circuit in an embodiment may be configured to power down the transceiver in case the read version identifier matches with the stored version identifier of the firmware stored in the memory of the driver device.

This enables to simply attach the NFC tag to the driver device and then to leave the NFC tag in place at the driver device until a new firmware version is available. When a new firmware version is available, a new NFC tag storing a new data file for the new firmware version may simply replace the NFC tag currently in place at the driver device.

The driver device includes the wireless transceiver configured to generate a magnetic field for powering a reading process for reading the data file from the passive near field communication tag.

The driver device performs functions of a known NFC reader capable to read data from a passive NFC tag arranged at short distance between the driver device and the NFC tag. Passive NFC communication involves only transmitting information over a short range, for example some centimetres, decimetres or up 1.5 metres, thereby advantageously addressing privacy and confidentiality issues.

The driver device according to a preferred embodiment further comprises a visual output means, in particular comprising at least one light emitting diode (LED), and the control circuit configured to control the visual output means to emit a predefined light pattern while the updating the firmware.

Thus, interrupting the updating process, for example by removing the NFC tag may be avoided and a simple means of control concerning start of updating the firmware, or successfully completing the update process may be signalled to the environment of the driver device. In particular, someone who arranges the NFC tag at the driver device for performing an update of the firmware has an immediate feedback on positioning the NFC tag correctly at the driver device. Moreover, emergency driver devices may require by statute any update process due to being not available during the update process, and successful completion of an update.

In an advantageous embodiment, the driver device includes the control circuit configured to control the driving circuit to cease providing a load current to the lighting device in case the transceiver does not detect the presence of a passive near field communication tag within range of the antenna.

Therefore, a quality control sticker including a NFC tag may act as simple means to avoid unauthorized operation of the driver device, or—in case the quality control sticker blocks access to the interior of a housing of the driver device—may avoid that a user opens the driver device, then modifies the driver device, and is, although having tampered with electric circuitry inside the driver device, able to put the driver device into operation again.

The driver device according to an advantageous embodiment comprises a housing and a visual marker arranged externally on the housing. The visual marker serves to define a position for attaching the near field communication tag in a predetermined position to the visual marker and therefore in a defined position within the range of the antenna.

Thus a stable communication link between an NFC reader, in the present case the transceiver and the antenna of the driver device, and the NFC tag, is achievable with further reference to handbooks or experienced service personal.

In an advantageous embodiment, the driver device is an emergency driver device. The firmware is configured to control a charging process for charging a rechargeable battery with a first type of battery chemistry, and updating the firmware changes the charging process to a second type of battery chemistry.

This advantageous embodiment enables to exchange rechargeable batteries in use with the emergency driver device without having to maintain a same battery chemistry between the rechargeable batteries.

The second aspect concerns a sticker device comprising means configured to visually display a firmware version identifier. The sticker device is characterized in comprising a tag memory configured to store a data file that corresponds to the version identifier, and a transceiver, which is configured to perform near field communication and to transmit the stored data file in response to a received transmission request.

A sticker device including an NFC tag is still an item of low cost. NFC tags on the other hand are readily available with enough memory storage capacity to store data files with a file size sufficient for updating the firmware of the driver device. Simultaneously, the sticker device provides visual indication what firmware version is installed in the driver device, as the low cost sticker device remains on the driver device after the update process has been completed and thus performs all functions of a known type plate of the driver device identifying the firmware installed, which is an essential part of a driver device configuration.

Preferably, the sticker device further comprises attachment means adapted to separably attach the sticker device to a housing of a driver device.

By removing a former sticker device from the housing and attaching the new sticker device to the housing of the driver device, the user simultaneously starts an updating process of the firmware of the driver device and amends the visual documentation of the firmware configuration of the driver device. Each time the sticker device is replaced, configuration information of the driver device on the exterior of the driver device is automatically adapted to the firmware version being installed using the NFC capabilities of the driver device and the sticker device.

A system according to a third aspect comprises a driver device according to the first aspect, and a sticker device according to the second aspect attached to the driver device.

It is advantageous, when the driver device arranges the sticker device on an openable housing of the driver device such that in case someone opens the openable housing invariably removes the sticker device beyond the range of the near field communication or even destroys the sticker device.

The driver device performs as some kind of seal that inhibits access to the interior of the housing of the driver device for an unauthorized person.

A method for updating control firmware of a driver device for driving at least one lighting device according to the fourth aspect concerns the driver device comprising a driving circuit, a control circuit configured to control the driving circuit based on a firmware stored in a memory of the driver device, and a transceiver configured to perform near field communication via an antenna. The method comprises steps of controlling, by the control circuit, the transceiver to detect a presence of a near field communication tag within range of the antenna, and, in case the transceiver detects presence of the near field communication tag, controlling, by the control circuit, the transceiver to acquire a data file from the detected passive near field communication tag. The control circuit performs then at least one of updating the firmware or controlling the driving circuit based on the acquired data file.

BRIEF DESCRIPTION OF THE DRAWINGS

An embodiments of the invention is discussed with reference to the attached figures, in which FIG. 1 provides an overview over an embodiment arranging a sticker device and a driver device.

DETAILED DESCRIPTION OF THE PREFERRED EMBODIMENT

Same reference signs in different figures denote same or corresponding elements. The discussion of embodiments avoids discussing same reference signs in different figures wherever deemed possible for sake of conciseness.

Figure 1:
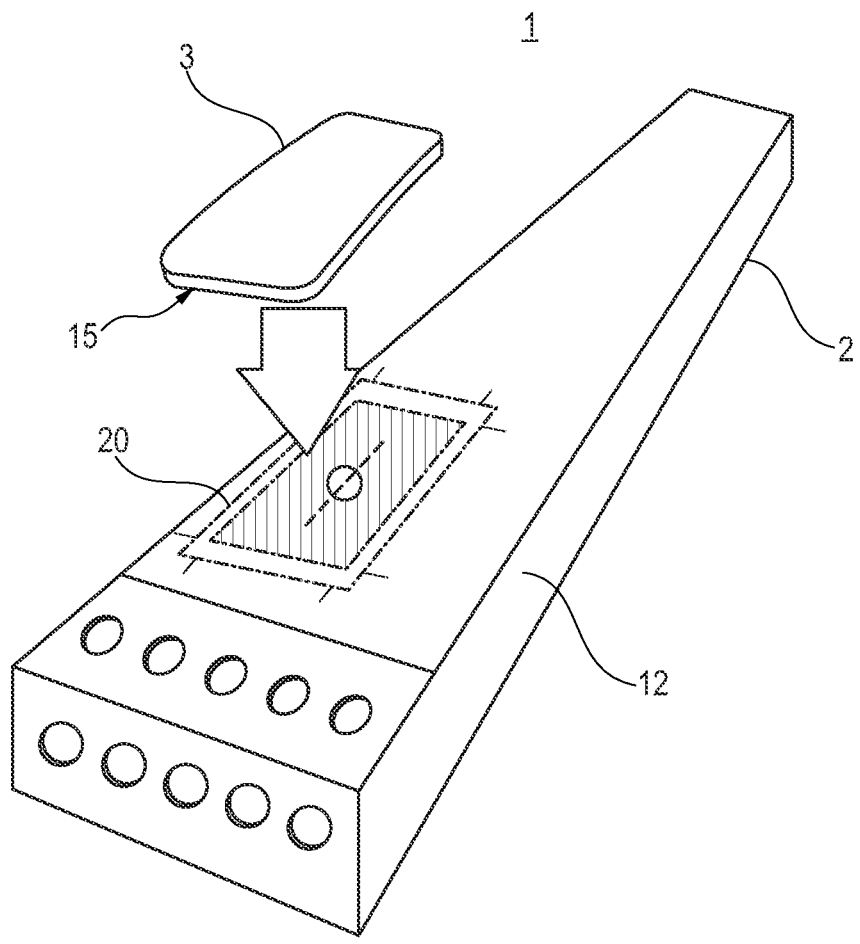

FIG. 1 presents an overview over an embodiment including a system 1 that includes a sticker device 3 and a driver device 2.

he driver device 2 may be an emergency light driver. The driver device 2 comprises a housing 12. The housing 12 may be openable in order to provide access to electric circuits arranged on one or more printed circuit boards inside the housing 12. The housing 12 provides on one side printed information on the driver device 2 such as manufacturer information, information on type of driver device, serial number, identification codes in form of bar codes, information on electric ratings, information on connectors, and quality approval information, for example. The housing 12 preferably arranges this printed information such that the information is readable when the driver device 2 is mounted in a typical lighting fixture.

The housing 12 is configured to provide access to a plurality of sockets, for example to connect an AC mains supply, to connect one or more lighting devices, for example lighting modules comprising a plurality of light emitting diodes supplied by the driver device 2 with a load current (DC current). The sockets may enable to connect a rechargeable battery arranged externally to the driver device 2. This configuration is characteristic for emergency light driver devices, which enable to drive the load current to emergency lighting modules either from AC mains supply or, in case of detecting a mains supply failure, from electric energy drawn from the rechargeable battery.

The sockets may include sockets for performing communication, for example wired communication according to a communication standard, e.g. DALI. The sockets also include sockets for dedicated control lines for controlling operation of the driver device 2, for example for connecting switches, dimmer, presence sensors.

The driver device 2 depicted in FIG. 1 includes a visual marker 20 on the housing 12. The visual marker 20 highlights an area on the outside of the housing 12. The sticker device 3 is to be applied to the area on the housing, which is highlighted by the visual marker 20. The visual marker 20 may be of any outline or form. Preferably, the visual marker 20 is printed onto the housing 12. The area highlighted by the visual marker 20 corresponds to a position of an antenna, for example an antenna loop not visible in FIG. 1 due to being arranged in the interior of the housing 12. When arranging an NFC tag on the area denoted by the visual marker 20, a magnetic field generated by the antenna encompasses the NFC tag. Thus, a reading operation for reading data from the NFC tag may be performed when arranging the NFC tag on the area denoted by the visual marker 20.

The sticker device 3 includes an NFC tag. The sticker device may encase the NFC tag and include an adhesive film 30 on a side directed towards the driver device 2. The adhesive film 30 enables to fix the sticker device 3 on the housing 12, in particular on the area denoted by the visual marker 20. The adhesive film 30 is one example for attaching the sticker device 3 onto the driver device 2. The adhesive film 30 provides an arrangement, which is ensures a stable and durable mechanical connection between the sticker device 3 and the driver device 2 on the one hand, which may be dissolved on the other hand in order to replace the sticker device 3 with another sticker device. The other sticker device may comprise a NFC tag, which stores a data file with a different firmware version.

The sticker device 3 arranges printed information on a surface facing away from the driver device 2 when attaching the sticker device 3 on the housing of the driver device 2. In particular, the information printed on the sticker device 3 may include a firmware version identifier. The firmware version identifier corresponds to a version of the firmware stored in a tag memory of the NFC tag. The firmware version identifier may be stored in electric form in the tag memory of the NFC tag.

NFC tags currently available may have up to 2 kbyte of memory. A typical example for a current NFC tag stores about 900 byte in its tag memory. The tag memory may, for example comprise a 64 kbit EEPROM.

The information printed on the sticker device 3 may include information on a type, or on a plurality of types of driver devices, the firmware stored in the tag memory may be running or been tested.

The arrangement of the sticker device 3 and the driver device 2 of FIG. 1 represents one particular example. Alternatively, the sticker device may be arranged such that any attempt to open the housing 12 in order to get access to the interior of the housing 12 may require removing the sticker device 3 or may result in breaking the sticker device 3. Removing the sticker device 3 removes the sticker device 3 from the magnetic field of the antenna. Thus, the driver device 2 acting as a NFC reader cannot detect the NFC tag of the sticker device 3, nor reading any data in a readout process from the NFC tag.

In present context, the term firmware relates to a specific class of computer software running on a processor that provides a low-level control for a specific hardware of a device. Firmware may provide a standardized operating environment for more a complex device application software. The device application software may therefore allowing more hardware-independent features. In case of less complex devices such as light driver devices, the firmware may act as the operating system of the driver device, performing all control, monitoring and possibly data manipulation functions performed by the device. The firmware such as the program of an embedded system may be the only program that will run on the system and provide all of its functions.

The firmware is stored in a non-volatile memory such as a ROM, an EPROM, or flash memory. In the past, changing or amending the firmware of a driver device was rarely or never done during its lifetime, but is now a more common procedure. Common reasons for updating the firmware include fixing bugs or adding new features to the driver device 2. Traditionally, this required physically replacing ROM integrated circuits, or reprogramming an EPROM or flash memory by performing a special programming procedure via a communication link. Such external communication link is not always available in the field and may be only possible at the manufacturer's site.

Figure 2:
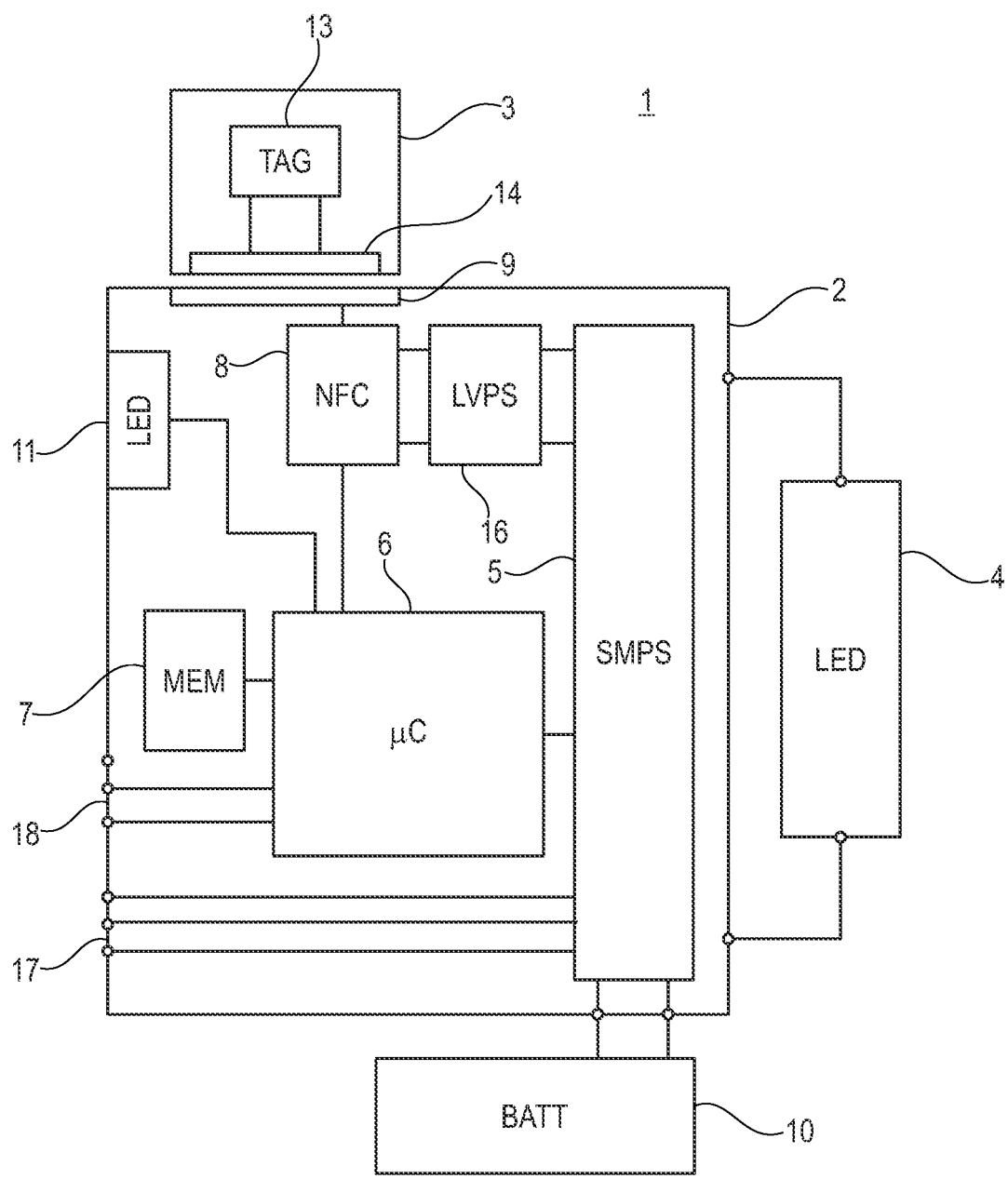
FIG. 2 presents a simplified diagram displaying functional blocks of the driver device and the sticker device in an emergency lighting application, FIG. 3 provides a flowchart for an updating method for updating the firmware of a driver device, and FIG. 4 displays steps for the reading process for reading an update data file from a sticker device.

FIG. 2 is a simplified diagram displaying functional blocks of the driver device 2 and the sticker device 3 in an emergency lighting application.

The emergency lighting system 1 comprises the driver device 2, which includes one or more switched mode power supply circuits, converter circuits in its driver circuit 5. The driver circuit 5 provides a load current for driving one or more lighting devices 4. The lighting device 4 may be a lighting module with at least one LED.

The driver circuit 5 generates and supplies supply voltages, in particular low power DC supply voltages for the electronic circuits of the driver device 2. The electronic circuits in particular include the control circuit 6 and a low voltage power supply circuit 16 supplying a near field communication reader circuit 8 (NFC circuit 8). Current NFC readers may consume about 100 mW during operation.

The NFC reader circuit 8 may perform near field communication via an antenna 9 and act as a transceiver. The NFC circuit 8 may operate on a frequency of 13.56 MHz, with a data transmission rate of 424 kbit per second. Other transmission characteristics, for example characteristics typical for RFID applications for transmission ranges of about 10 cm may also enable to implement the communication between NFC tag resp. sticker device 3 on the one hand, and driver device 2 and its NFC reader circuit 8 on the other hand.

The NFC reader circuit 8 may operate in different states under control of the control circuit 6. A first state may be a power off state of the NFC circuit 8. A second state may power on state, in which the NFC reader circuit 8 performs a firmware version check. In a third sate of the NFC reader circuit 8, the NFC reader circuit 8 performs a reading process for acquiring a data file from a tag memory of the NFC tag.

The driver device 2 further includes a mains AC supply interface 18 and a control interface 18.

The driver device 2 comprises a battery interface for connecting a rechargeable battery 10. The driver circuit 5 generates a battery charging current for charging the rechargeable battery 10 in a battery charging process. The charging algorithm on which the battery charging process bases, depends on a battery chemistry of the rechargeable battery 10.

The control circuit 6 of the driver circuit 2 may be microprocessor (microcontroller) running the firmware to perform all control functions in the lighting device 2. In particular, the firmware running on the control circuit 6 may control the load current provided to the lighting device 4 and the battery charging current during the battery charging process. The firmware may control a switchover from a mains AC supply backed operation to a battery-based operation in case of a mains AC supply failure.

The memory 7 may store program data including the firmware, application data and log data relating to processes performed by the driver circuit 2. The memory 7 may in particular store the firmware and a firmware version identifier unambiguously identifying the version of the firmware currently stored in the memory 7, and running on the control circuit 6, and on which the current operation of the driver device 2 is based.

The memory 7 and the control circuit 6 may be implemented using one integrated circuit (IC).

The control circuit 6 further controls a visual output means 11. The visual output means may include one or plural LEDs (indicator LED), for example LEDs emitting red and/or green light visible from the exterior of the housing 12. The control circuit 6 may signal an operating status of the driver device 2 using the visual output means 11 by emitting light with a predetermined light pattern, for example including a time dependent light pattern such as a flashing (blinking) light, or a specific colour pattern.

In particular, the control circuit 6 may control the visual output means 11 to emit a predefined light pattern in order to signal an ongoing update process for the firmware. Alternatively or additionally, the control circuit 6 may control the visual output means 11 to emit a predefined light pattern in order to indicate successful completion or failure of the update process for the firmware.

The driver device 2 includes the NFC reader circuit 8. The NFC reader circuit 8 is one particular example of a transceiver performing near field communication using a magnetic field generated by an antenna 9. An antenna loop or an antenna coil may implement the antenna 9.

The NFC reader circuit 8 may perform near field communication with a frequency of 13.56 MHz according to the NFC standard with a communication counterpart arranged in the magnetic field generated by the NFC reader circuit 8 with the antenna 9.

The system 1 arranges an NFC tag 13 with a tag antenna 14 in a sticker device 3 magnetically coupled in the magnetic field generated by the NFC reader circuit 8 with the antenna 9. The control circuit 6 may control the NFC reader circuit 8 to detect presence of the NFC tag 13 (detection process) with its tag antenna 14 in the magnetic field. Furthermore, the control circuit 6 may control the NFC reader circuit 8 to perform a readout process from a tag memory of the detected NFC tag 13.

The sticker device 3 may arrange the tag antenna 14 and the NFC tag 13 in a sticker device enclosure so that a force exerted on the sticker device 3 and exceeding a predefined threshold level destroys an electric connection between the tag antenna 14 and the NFC tag 13. Consequently, the control circuit 6 controlling the NFC reader circuit 8 in the detection process is then not able to detect the presence of the NFC tag 13 with its tag antenna 14 in the magnetic field. Given this case, the control circuit 6 may inhibit the driver circuit 5 from providing the load current to the lighting device 4, assuming that an illicit opening of a housing of the driver device 2 has occurred by unauthorized personnel without properly replacing the sticker device 3. In this application scenario, the sticker device acts as a quality sticker or quality seal for the driver device 2.

Figure 3:
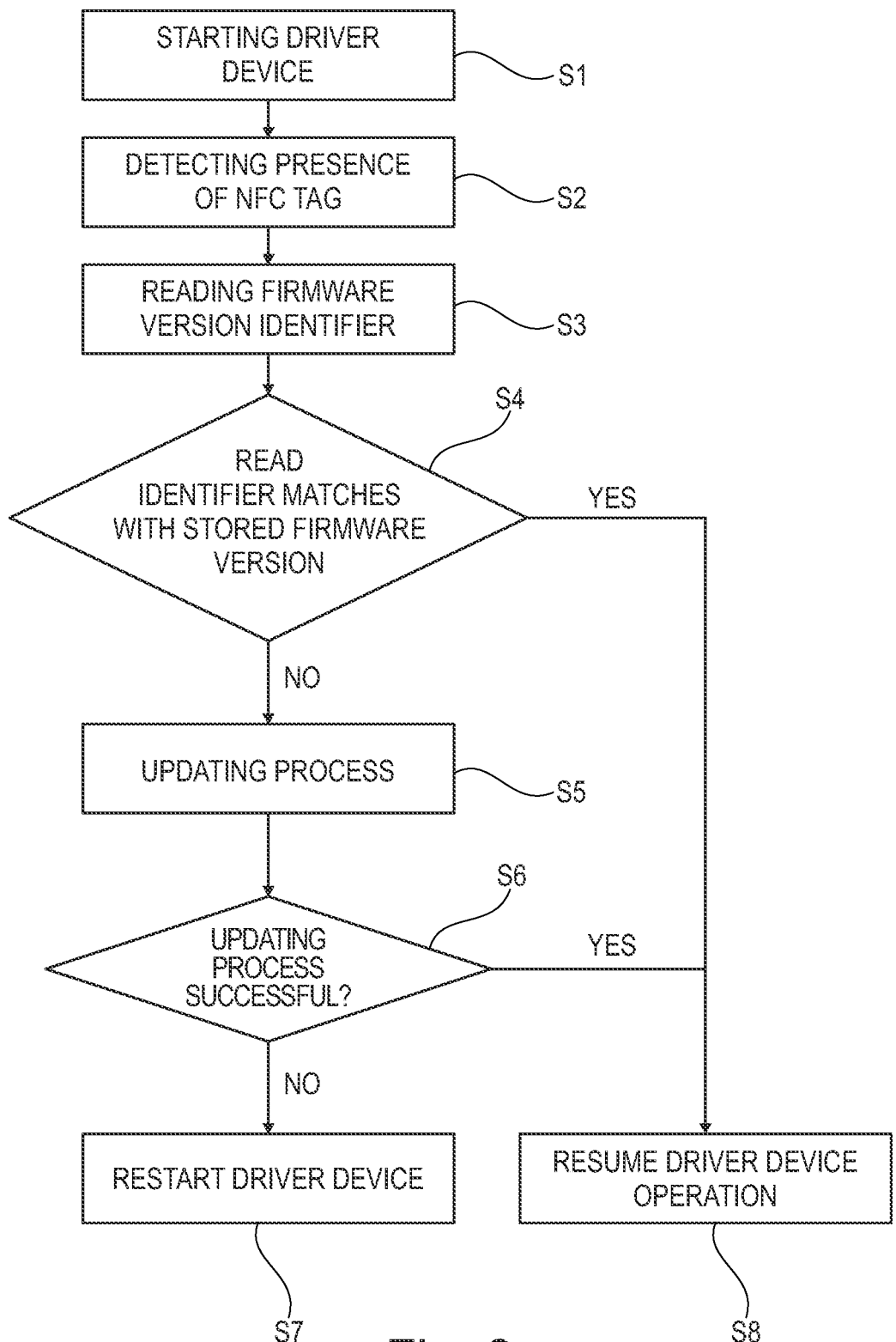

FIG. 3 shows a flowchart for an updating method for updating the firmware of a driver device 2.

In step S1, the driver device 2 starts operation. For example, the driver device 2 switches on (powered up). The control circuit 6 may in particular start the NFC reader circuit 8. The control circuit 6 may start the NFC reader circuit 8 by controlling the low voltage power supply circuit 16 to provide power to the NFC reader circuit 8.

In step S2, the control circuit 6 starts a detection process. In the detection process, the NFC reader circuit 8 performs detection if the NFC tag 13 is present in the magnetic field generated by the NFC reader circuit 8.

In step S3, the control circuit 6 controls the NFC reader circuit 8 to perform a readout process, in which the NFC reader circuit 8 reads a firmware version identifier from the tag memory of the NFC tag. The control circuit 6 then proceeds to step S4 to determine, whether the firmware version identifier acquired from the NFC tag 13 in the reading process matches with a version identifier of the firmware currently stored in the memory 7 and the control circuit 6 is running.

In case the firmware version identifier acquired from the NFC tag in the reading process matches with the version identifier of the firmware currently stored in the memory 7, the control circuit 6 proceeds to step S8. In step S8, the control circuit 8 resumes operation of the driver device 2. In particular, the control circuit 8 controls based on the firmware the driver device 2 to operate according to the applicable operation mode.

In case the firmware version identifier acquired from the NFC tag in the reading process does not match with a version identifier of the firmware currently stored in the memory 7, the control circuit 6 proceeds to step S5. In particular, if the firmware version identifier acquired from the NFC tag indicates a newer, improved or updated version of the firmware being stored in the tag memory when compared to the firmware the control circuit 6 currently bases its operation on, the control circuit 6 starts the firmware updating process of step S5.

The updating process is discussed with reference to FIG. 4 in more detail.

After performing the updating process of step S5, the control circuit 6 proceeds to step S6. In step S6, the control circuit determines whether the updating process has been completed successfully. In case the updating process has been completed successfully (YES), the control circuit 6 proceeds to step S8.

In step S8, the control circuit 6 resumes operation of the driver device 2. In particular, the control circuit 8 controls based on the updated firmware the driver device 2 to operate according to the applicable operation mode. For example, the driving circuit 5 supplies the load current to the lighting device 4 based on electric power drawn from either AC mains supply 17 ("standard mode of operation) or from the rechargeable battery 10 (emergency mode of operation).

In case the control circuit 6 determines in step S6, that the updating process has not been completed successfully (NO), the control circuit 6 proceeds to step S7.

In step S7, the control circuit 6 initiates a restart of the driver device 2. The restart of the driver device 2 in step S7 may result in a retry of the updating process via steps S1 to S6, or may even be necessary to finalize the update (installation) of the firmware from the original version stored in the memory 7 to the new version of the firmware acquired from the NFC tag.

Figure 4:
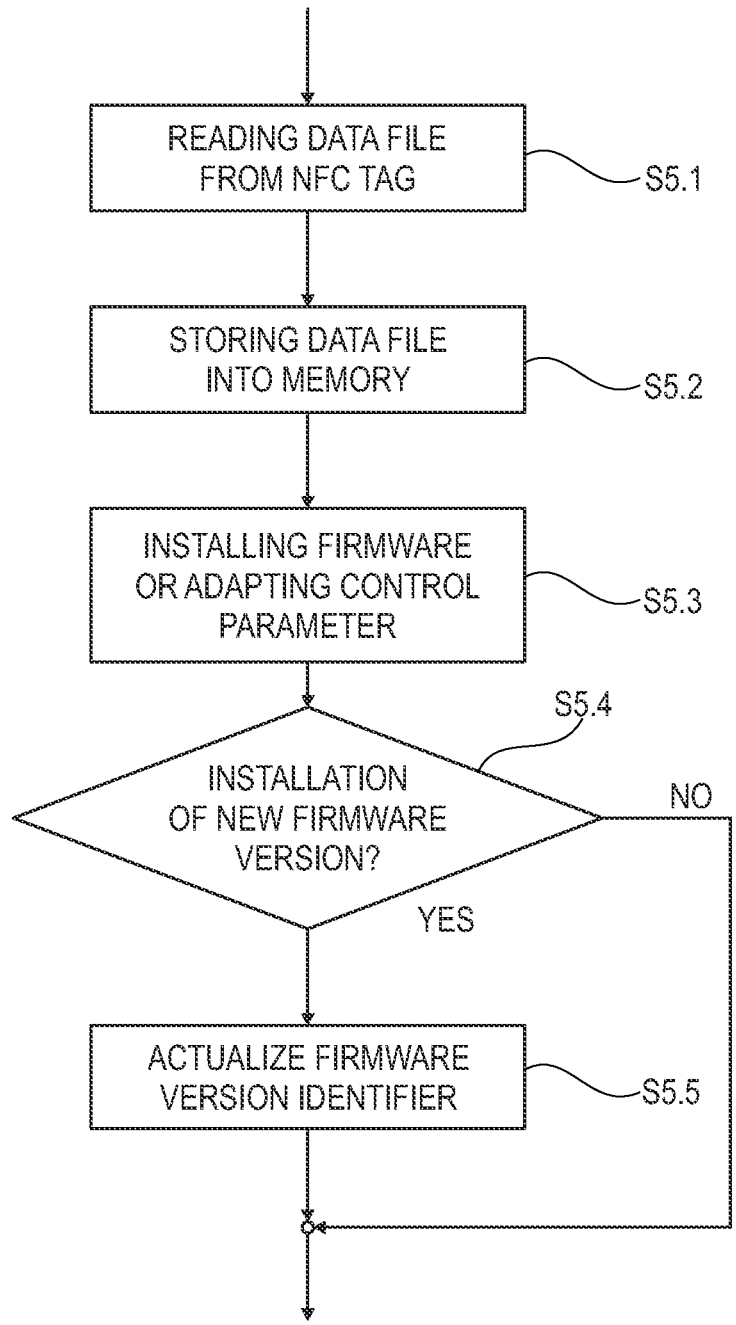

FIG. 4 displays a flowchart with the steps performing a reading process reading a data file from a sticker device 3.

Step S5.1, the control circuit 6 controls the NFC reader circuit 8 to perform a reading process, in which the NFC reader circuit 8 reads the data file corresponding to the a firmware version identifier from the tag memory of the NFC tag.

The control circuit 6 then proceeds to step S5.2 and stores the data file acquired in the reading process of step S5.1 into the memory 7.

In step S5.3, the control circuit 6 installs the new firmware from the data file stored in the memory 7. Additionally or alternatively, the control circuit 6 adapts at least one control parameter the control circuit 6 bases control of operation of the driving circuit 5 on based on the stored data file in the memory 7.

Examples for the control parameter include a minimal load current value, a rated service time in the emergency mode of operation, and a minimal charging level of the rechargeable battery 10 in case of the driver device 2 being an emergency driver device.

In step S5.3, the control circuit 6 may, after performing successfully installing the new firmware, set an update flag. This update flag may enable to determine in step S6 of the flowchart of FIG. 3, whether the updating process was successful, or if, for example, a restart of the driver device 2 may be necessary to finalize installation of the updated firmware.

In step S5.4, the control circuit 6 determines if a new firmware version has been installed from the data file stored in the memory 7.

In case, in step S5.4, the control circuit determines that a new firmware version has been installed, the control circuit 2 proceeds to step S5.5 and actualizes the firmware version identifier. In particular, the control circuit 2 stores the firmware version identifier of the firmware read from the tag device into the memory 7.

In case, in step S5.4, the control circuit 6 determines that a new firmware version has been installed, the control circuit 2 proceeds to step S5.5 and actualizes the firmware version identifier.

In case the control circuit 6 determines in step S5.4, that no new firmware has been installed, the control circuit 2 skips step S5.5. The control circuit 6 then proceeds with step S6 in FIG. 3.

The invention claimed is:

1. A system comprising a driver device for driving at least one lighting device (4) and a passive near field communication tag (3), the driver device comprising
a driving circuit (5) having a housing,
a control circuit (6) contained in the housing configured to control the driving circuit (5) based on a firmware stored in a memory (7) contained in the housing, and
a driver transceiver (8) contained in the housing configured to perform near field communication via a driver antenna (9), and the control circuit (6) is configured to control the driver transceiver (8) to detect a presence of the near field communication tag (3) within range of the driver antenna (9)
wherein
the passive near field communication tag (3) is contained in a sticker device comprising means configured to display visually a firmware version identifier, wherein the passive near field communication tag (3) contained in a sticker device comprises a data file that corresponds to the version identifier,
a tag antenna (14) which together with the passive near field communication tag forms a sticker transceiver that is configured to perform near field communication and to transmit the stored data file in response to a received transmission request, and
releasable adhesive (15) adapted to attach the sticker device to a the housing (12) of the driver device (2),
wherein the control circuit (6) is configured to control the driver transceiver (8) to acquire a data file from the detected passive near field communication tag (3) contained in the sticker device, to perform at least one of updating the firmware or controlling the driving circuit (5) based on the acquired data file, and is further configured to control the light driving circuit (5) to stop providing a load current to the lighting device (4) in case the driver transceiver (8) does not detect the presence of a sticker transceiver within range of the driver antenna (9).

2. The system according to claim 1, wherein
the control circuit (6) is configured to control the driver transceiver (8) to read a version identifier corresponding to the data file from the detected passive near field communication tag (3) contained in a the sticker device, and to compare the read version identifier with a version identifier of the firmware stored in the memory (7), and,
in case the firmware version identifier differs from the stored version identifier, to update the firmware based on the acquired data file.

3. The system according to claim 1, wherein
the control circuit (6) is configured to control the driver transceiver (8) to detect presence of the passive near field communication tag (3) contained in a sticker device during a power-up process of the driver device.

4. The system according to claim 2, wherein
the control circuit (6) is configured to power down the driver transceiver (8) in case the read version identifier matches with the stored version identifier of the firmware stored in the memory (7).

5. The system according to claim 1, wherein
the driver transceiver (6) is configured to generate a magnetic field for powering a reading process for reading the data file from the passive near field communication tag (3) contained in a sticker device.

6. The system according to claim 1, wherein
the driver device further comprises a visual output means (11), in particular at least one LED, and the control circuit (6) is configured to control the visual output means (11) to emit a predefined light pattern while the updating the firmware.

7. The system according to claim 1, wherein
a visual marker (20) is arranged externally on the housing (12) for attaching the sticker device and the near field communication tag (30) in a predetermined position relative to the visual marker (20) and within the range of the driver antenna (9).

8. The system according to claim 1, wherein
the driver device (2) arranges the near field communication tag (3) contained in a sticker device on an openable housing (12) of the driver device (2), wherein opening the openable housing (12) removes the near field communication tag (3) contained in a sticker device beyond the range of the driver antenna (9) or destroys the near field communication tag (3) contained in a sticker device.

9. A method for updating firmware of a driver device (2) for driving at least one lighting device (4),
wherein the driver device comprises a housing, a light driving circuit (5), a control circuit (6) configured to control the driving circuit (5) based on firmware stored in a memory (7) of the driver device (2), and
a driver transceiver (8) configured to perform near field communication via an a driver antenna (9), the light driving circuit (5) and the control circuit (6) being contained in the housing and the driver antenna being contained in or adjacent the housing, the method comprising the steps of:
placing a sticker device on the housing, the sticker device having a tag antenna and a passive near field communication tag containing data with firmware and a version identifier;
controlling, by the control circuit (6), the driver transceiver (8) to detect the presence of the passive near field communication tag (3) contained in the sticker device within range of the driver antenna (9) during a power-up process of the driver device, and
controlling, by the control circuit (6), the driver transceiver (8) to acquire the data with firmware and a version identifier from the detected passive near field communication tag (3) in case the transceiver (8) detects presence of the near field communication tag (3) contained in the sticker device,
determining whether the acquired version identifier matches a version identifier of the firmware stored in the memory of the driver device;
if the acquired version identifier does not match the version identifier of the firmware stored in the memory of the driver device, performing, by the control circuit (6), updating the firmware based on the firmware in the acquired data and restarting the driver device, and
if the acquired version identifier does match the version identifier of the firmware stored in the memory of the driver device, resuming driver device operation, and powering down the driver transceiver (8).

10. A system comprising an emergency driver device for driving at least one lighting device (4) and a replacement rechargeable battery, the driver device comprising:
- a driving circuit (5) having a housing, a switched-mode power supply (5) and a first rechargeable battery, the first rechargeable battery having a first type of battery chemistry;
- a control circuit (6) contained in the housing configured to control the driving circuit (5) based on a firmware stored in a memory (7) contained in the housing, wherein the firmware being configured to control a charging current from the switched-mode power supply (5) to charge the first rechargeable battery (10) with the first type of battery chemistry in accordance with a first charging process;
- a driver transceiver (8) contained in the housing configured to perform near field communication via a driver antenna (9), the control circuit (6) being configured to control the driver transceiver (8) to detect a presence of the near field communication tag (3) within range of the driver antenna (9), wherein, if detected, the control circuit (6) is configured to control the driver transceiver (8) to acquire a data file from the detected passive near field communication tag (3);
- a replacement rechargeable battery having a second type of battery chemistry; and
- a sticker device including a passive near field communication tag, a sticker antenna, and releasable adhesive adapted to attach the sticker device to the housing (12) of the driver device (2), said passive near field communication tag containing a stored data file with firmware to update changes in the charging process to accommodate the second type of battery chemistry which is used by the replacement rechargeable battery, wherein the sticker device is configured to perform passive near field communication and to transmit the stored data file in response to a received transmission request.

* * * * *

UNITED STATES PATENT AND TRADEMARK OFFICE
CERTIFICATE OF CORRECTION

| | | |
|---|---|---|
| PATENT NO. | : 12,474,916 B2 | Page 1 of 1 |
| APPLICATION NO. | : 18/252603 | |
| DATED | : November 18, 2025 | |
| INVENTOR(S) | : Daniel Renaud et al. | |

It is certified that error appears in the above-identified patent and that said Letters Patent is hereby corrected as shown below:

In the Claims

Claim 1, Column 11, Line 37, Delete "to a the housing" and substitute therefor -- to the housing --;

Claim 2, Column 11, Line 53, Delete "in a the sticker" and substitute therefor -- in the sticker --;

Claim 9, Column 12, Line 36, Delete "via an a driver" and substitute therefor -- via a driver --.

Signed and Sealed this
Third Day of February, 2026

John A. Squires
*Director of the United States Patent and Trademark Office*